US009525983B2

(12) United States Patent
Pascoe et al.

(10) Patent No.: US 9,525,983 B2
(45) Date of Patent: Dec. 20, 2016

(54) METHODS, SYSTEMS, AND COMPUTER READABLE MEDIA FOR PROVIDING MOBILE NETWORK OPERATOR CONTROLLED CONTENT TO MOBILE SUBSCRIBERS USING SOCIAL NETWORKING MESSAGES

(75) Inventors: Alan Pascoe, Raleigh, NC (US); Ronald Cornelisse, Driehuis (NL)

(73) Assignee: TEKELEC, INC., Morrisville, NC (US)

( * ) Notice: Subject to any disclaimer, the term of this patent is extended or adjusted under 35 U.S.C. 154(b) by 366 days.

(21) Appl. No.: 12/844,514

(22) Filed: Jul. 27, 2010

(65) Prior Publication Data
US 2011/0022669 A1    Jan. 27, 2011

Related U.S. Application Data

(60) Provisional application No. 61/228,964, filed on Jul. 27, 2009.

(51) Int. Cl.
   *G06F 15/16*   (2006.01)
   *G06F 15/173*  (2006.01)
   (Continued)

(52) U.S. Cl.
   CPC ............... *H04W 4/12* (2013.01); *G06Q 30/02* (2013.01); *H04L 12/5895* (2013.01);
   (Continued)

(58) Field of Classification Search
   CPC . H04L 12/5835; H04L 12/5895; H04L 51/066
   See application file for complete search history.

(56) References Cited

U.S. PATENT DOCUMENTS

| 5,768,509 A | 6/1998 | Gunluk |
| 6,577,723 B1 | 6/2003 | Mooney |

(Continued)

FOREIGN PATENT DOCUMENTS

| CN | 1625146 A | 6/2005 |
| EP | 1 271 908 A2 | 1/2003 |

(Continued)

OTHER PUBLICATIONS

Gahran, "contentious.com—Twitter via text messaging, on the cheap", Mar. 25, 2009, accessed Aug. 11, 2012 at <http://www.contentious.com/2009/03/25/twitter-via-text-messaging-on-the-cheap/>.*

(Continued)

*Primary Examiner* — Karen Tang
(74) *Attorney, Agent, or Firm* — Jenkins, Wilson, Taylor & Hunt, P.A.

(57) ABSTRACT

The subject matter described herein includes methods, systems, and computer readable media for providing mobile network operator controlled content to mobile subscribers using social networking messages. According to one aspect, a method for providing mobile network operator controlled content to mobile subscribers using social networking messages is provided. The method includes receiving, at a mobile network operator node, a message for delivery to a mobile subscriber of the mobile network operator's network. The method further includes determining whether the message is a social networking message. The method further includes, in response to determining that the message is a social networking message, providing mobile network operator controlled content to the subscriber.

12 Claims, 2 Drawing Sheets

(51) Int. Cl.
*H04W 4/12* (2009.01)
*G06Q 30/02* (2012.01)
*H04L 12/58* (2006.01)

(52) U.S. Cl.
CPC .......... *H04L 51/38* (2013.01); *H04L 12/5835* (2013.01); *H04L 51/066* (2013.01)

(56) References Cited

U.S. PATENT DOCUMENTS

| | | | |
|---|---|---|---|
| 7,072,667 | B2 | 7/2006 | Olrik et al. |
| 7,095,829 | B2 | 8/2006 | Claudatos et al. |
| 7,116,972 | B1 | 10/2006 | Zhang et al. |
| 7,120,455 | B1 | 10/2006 | Chen et al. |
| 7,136,634 | B1 | 11/2006 | Rissanen et al. |
| 7,155,243 | B2 | 12/2006 | Baldwin et al. |
| 7,248,857 | B1 | 7/2007 | Richardson et al. |
| 7,321,779 | B2 | 1/2008 | Kang |
| 7,394,818 | B1 | 7/2008 | Johnson et al. |
| 7,403,788 | B2 | 7/2008 | Trioano et al. |
| 7,454,164 | B2 | 11/2008 | Goss |
| 7,463,898 | B2 | 12/2008 | Bayne |
| 7,502,335 | B2 | 3/2009 | Lin |
| 7,548,756 | B2 | 6/2009 | Velthuis et al. |
| 7,817,987 | B2 | 10/2010 | Mian et al. |
| 7,912,908 | B2 | 3/2011 | Cai et al. |
| 7,917,128 | B2 | 3/2011 | Niekerk et al. |
| 8,204,057 | B2 | 6/2012 | Marsico et al. |
| 2002/0010745 | A1 | 1/2002 | Schneider |
| 2002/0013711 | A1 | 1/2002 | Ahuja et al. |
| 2002/0023164 | A1 | 2/2002 | Lahr |
| 2002/0126708 | A1 | 9/2002 | Skog et al. |
| 2003/0003935 | A1 | 1/2003 | Vesikivi et al. |
| 2003/0027591 | A1 | 2/2003 | Wall |
| 2003/0032409 | A1 | 2/2003 | Hutcheson et al. |
| 2003/0069991 | A1 | 4/2003 | Brescia |
| 2003/0131263 | A1 | 7/2003 | Keane et al. |
| 2004/0054576 | A1 | 3/2004 | Kanerva et al. |
| 2004/0137922 | A1 | 7/2004 | Kang |
| 2004/0243719 | A1 | 12/2004 | Roselinsky |
| 2005/0003838 | A1 | 1/2005 | McCann et al. |
| 2005/0021666 | A1 | 1/2005 | Dinnage et al. |
| 2005/0068971 | A1 | 3/2005 | Meisl et al. |
| 2005/0130685 | A1 | 6/2005 | Jenkin |
| 2005/0164721 | A1 | 7/2005 | Eric Yeh et al. |
| 2006/0047572 | A1 | 3/2006 | Moore et al. |
| 2006/0168003 | A1 | 7/2006 | Vau et al. |
| 2006/0199597 | A1 | 9/2006 | Wright |
| 2006/0218613 | A1 | 9/2006 | Bushnell |
| 2006/0253453 | A1 | 11/2006 | Chmaytelli et al. |
| 2007/0026878 | A1 | 2/2007 | Midkiff et al. |
| 2007/0072591 | A1 | 3/2007 | McGary et al. |
| 2007/0088851 | A1 | 4/2007 | Levkovitz et al. |
| 2007/0266097 | A1 | 11/2007 | Harik et al. |
| 2007/0271139 | A1 | 11/2007 | Fiorini |
| 2007/0274483 | A1* | 11/2007 | Shapiro .................... 379/114.12 |
| 2007/0275738 | A1 | 11/2007 | Hewes et al. |
| 2007/0282954 | A1 | 12/2007 | Kim et al. |
| 2007/0287463 | A1 | 12/2007 | Wilson |
| 2008/0004046 | A1 | 1/2008 | Mumick et al. |
| 2008/0004047 | A1 | 1/2008 | Hill et al. |
| 2008/0013701 | A1 | 1/2008 | Barhydt et al. |
| 2008/0031196 | A1 | 2/2008 | Marathe et al. |
| 2008/0051066 | A1 | 2/2008 | Bandhole et al. |
| 2008/0080397 | A1 | 4/2008 | Niranjan et al. |
| 2008/0101370 | A1 | 5/2008 | Marsico et al. |
| 2008/0113677 | A1 | 5/2008 | Madnawat |
| 2008/0139170 | A1 | 6/2008 | Kahn |
| 2008/0243619 | A1 | 10/2008 | Sharman |
| 2008/0287150 | A1 | 11/2008 | Jiang et al. |
| 2009/0017794 | A1 | 1/2009 | Wilson |
| 2009/0030774 | A1* | 1/2009 | Rothschild et al. ............ 705/10 |
| 2009/0047980 | A1 | 2/2009 | Wilson |
| 2009/0111489 | A1 | 4/2009 | Wilson |
| 2009/0158136 | A1* | 6/2009 | Rossano et al. ............ 715/232 |
| 2009/0312040 | A1* | 12/2009 | Gupta et al. ................ 455/466 |
| 2010/0138306 | A1* | 6/2010 | James ....................... 705/14.69 |
| 2010/0210292 | A1 | 8/2010 | Nooren |
| 2010/0228582 | A1* | 9/2010 | King et al. .................... 705/7 |
| 2010/0268585 | A1* | 10/2010 | Padveen et al. ........... 705/14.16 |
| 2010/0280904 | A1* | 11/2010 | Ahuja ....................... 705/14.58 |
| 2010/0318611 | A1* | 12/2010 | Curtin et al. ................ 709/206 |

FOREIGN PATENT DOCUMENTS

| | | |
|---|---|---|
| EP | 1 542 482 A2 | 6/2005 |
| EP | 1 705 885 A1 | 9/2006 |
| GB | 2 380 364 A | 4/2003 |
| KR | 10-0600335 | 7/2006 |
| KR | 10-2008-0054737 | 6/2008 |
| KR | 10-2008-0111175 | 12/2008 |
| WO | WO 02/39765 A1 | 5/2002 |
| WO | WO 02/063849 A1 | 8/2002 |
| WO | WO 02/078381 A1 | 10/2002 |
| WO | WO 03/001770 A2 | 1/2003 |
| WO | WO 03/015430 A1 | 2/2003 |
| WO | WO 03/088690 A1 | 10/2003 |
| WO | WO 2004/019634 A1 | 3/2004 |
| WO | WO 2004/028108 A2 | 4/2004 |
| WO | WO 2004/100470 A1 | 11/2004 |
| WO | WO 2004/105405 A2 | 12/2004 |
| WO | WO 2007/038194 A1 | 4/2007 |
| WO | WO 2007/080570 A1 | 7/2007 |
| WO | WO 2007/141762 A1 | 12/2007 |
| WO | WO 2008/130565 | 10/2008 |
| WO | WO 2010/094038 A2 | 8/2010 |
| WO | WO 2011/017100 A2 | 2/2011 |

OTHER PUBLICATIONS

Notification of Transmittal of the International Search Report and the Written Opinion of the International Searching Authority, or the Declaration for International Application No. PCT/US2010/043386 (Apr. 19, 2011).

Cashmore, "Michael Jackson Dies: Twitter Tributes Now 30% of Tweets," Mashable! (Downloaded from the Internet on May 11, 2011) (Jun. 25, 2009).

"Monday Morning Madness," Twitter Blog from Jan. 5, 2009 (Downloaded from the Internet on May 11, 2011).

"Welcome to Magpie—the Largest Twitter Advertising Network," http://be-a-magpie.com/customer/how-it-works, pp. 1-4 (Downloaded from the Internet on Jul. 17, 2009).

"Hey there! tmn_pt is Using Twitter," www.twitter.com/tmn_pt (Downloaded from the Internet on May 12, 2011) Jun. 15, 2009.

"tmn+twitter," http://twitter.tmn.pt, 1 page (Downloaded from the Internet on May 12, 2011).

"Hey There! Portugaltelecom is using Twitter," www.twitter.com/portugaltelecom (Downloaded from the Internet on May 12, 2011) Jan. 5, 2009.

http://twitterholic.com, pp. 1-2 (Downloaded from the Internet on May 19, 2011) May 1, 2008.

First Examination Report for Indian Patent Application No. 2906/CHENP/2009 (Aug. 4, 2014).

Extended European Search Report for European Patent Application No. 07839734.6 (Nov. 28, 2013).

Third Office Action for Chinese Patent Application No. 200780048199.3 (Aug. 17, 2012).

Second Office Action for Chinese Patent Application No. 200780048199.3 (May 11, 2012).

Non-Final Office Action for U.S. Appl. No. 12/706,590 (May 4, 2012).

Notice of Allowance and Fee(s) Due for U.S. Appl. No. 11/809,200 (Feb. 16, 2012).

First Office Action for Chinese Patent Application No. 200780048199.3 (Nov. 25, 2011).

Interview Summary for U.S. Appl. No. 11/809,200 (Nov. 2, 2011).

Non-Final Official Action for U.S. Appl. No. 11/809,200 (Jul. 19, 2011).

Interview Summary for U.S. Appl. No. 11/809,200 (May 10, 2011).

Final Office Action for U.S. Appl. No. 11/809,200 (Feb. 16, 2011).

(56) References Cited

OTHER PUBLICATIONS

Interview Summary for U.S. Appl. No. 11/809,200 (Nov. 29, 2010).
Notification of Transmittal of the International Search Report and the Written Opinion of the International Searching Authority, or the Declaration for International Application No. PCT/US2010/024317 (Oct. 4, 2010).
Non-Final Office Action for U.S. Appl. No. 11/809,200 (Jun. 23, 2010).
Final Office Action for U.S. Appl. No. 11/809,200 (Jan. 25, 2010).
Interview Summary for U.S. Appl. No. 11/809,200 (Oct. 29, 2009).
Communication of European publication No. and information on the application of Article 67(3) EPC for European Patent Application No. 07839734.6 (Jul. 8, 2009).
Non-Final Office Action for U.S. Appl. No. 11/809,200 (Jun. 1, 2009).
Notification of Transmittal of the International Search Report and the Written Opinion of the International Searching Authority, or the Declaration for International Application No. PCT/US07/22440 (Mar. 14, 2008).
"3rd Generation Partnership Project; Technical Specification Group Terminals; Technical Realization of the Short Message Service (SMS) (Release 1998)," 3GPP TX 03.40 V7.5.0, pp. 1-118 (Dec. 2001).
"3rd Generation Partnership Project; Technical Specification Group Terminals; Technical Realization of Cell Broadcast Service (CBS) (Release 1998)," 3GPP TS 03.41 V7.4.0, pp. 1-31 (Sep. 2000).

\* cited by examiner

METHODS, SYSTEMS, AND COMPUTER READABLE MEDIA FOR PROVIDING MOBILE NETWORK OPERATOR CONTROLLED CONTENT TO MOBILE SUBSCRIBERS USING SOCIAL NETWORKING MESSAGES

PRIORITY CLAIM

This application claims the priority benefit of U.S. provisional patent application Ser. No. 61/228,964, filed on Jul. 27, 2009, the disclosure of which is incorporated herein by reference in its entirety.

TECHNICAL FIELD

The subject matter described herein relates to providing mobile network operator controlled content to mobile subscribers. More particularly, the subject matter described herein relates to methods, systems, and computer readable media for providing mobile network operator controlled content to mobile subscribers using social networking messages.

BACKGROUND

Social networking has become a popular way for people to follow what other people are doing. For example, Twitter is a service available at http://twitter.com that allows people, called followers, to receive updates any time the followed individual posts updates to a Twitter data center. When a followed person makes a post to the Twitter data center, the post is delivered via a method chosen by the followers for delivery of the posts. Using the Twitter service, the posts are typically short, because the service limits the size of the post to 140 characters.

One method for delivering Twitter updates to followers is short message service (SMS). As Twitter and similar social networking services are becoming more popular, the volume of SMS traffic due to such social networking has increased. One problem associated with this increased volume of traffic due to social networking is that the traffic utilizes network resources associated with the delivery of SMS messages and issues can arise as to who should pay for the utilization of those resources. For example, in some countries, subscribers do not pay for receiving SMS messages. When a mobile subscriber is roaming outside of his or her home network and receives a large volume of social networking messages transmitted via SMS, the mobile network operator of the network in which the party is roaming may look to the mobile subscriber's home network provider to pay for the delivery of the social networking messages. Because the home network provider does not charge for delivery of SMS messages to its subscribers, the home network provider may look to the social networking message provider to pay for the delivery of messages. Social networking providers, such as Twitter, do not charge followers for delivery of such messages. Accordingly, the social networking provider must pay the home network provider for delivery of its traffic so that the home network provider can reimburse the roaming network provider. Such charges may result in the social networking message provider eliminating or reducing the flow of messages to some mobile networks.

In light of these difficulties, there exists a need for methods, systems, and computer readable media for providing mobile network operator controlled content using social networking messages.

SUMMARY

The subject matter described herein includes methods, systems, and computer readable media for providing mobile network operator controlled content to mobile subscribers using social networking messages. According to one aspect, a method for providing mobile network operator controlled content to mobile subscribers using social networking messages is provided. The method includes receiving, at a mobile network operator node, a message for delivery to a mobile subscriber of the mobile network operator's network. The method further includes determining whether the message is a social networking message. The method further includes, in response to determining that the message is a social networking message, providing mobile network operator controlled content to the subscriber.

As used herein, the term "social networking message" refers to a message originated by a social networking server in response to receiving social networking content from a subscriber of a social networking service for distribution to the one or more subscribers or a message containing the content and generated by equipment downstream from the social networking server in response to the message generated by the social networking server for delivering the content to the one or more subscribers. For example, a social networking message can be a message generated by a short message service center downstream from a social networking server and used for delivering the social networking content to a subscriber or group of subscribers.

The subject matter described herein for providing mobile network operator controlled content to mobile subscribers using social networking messages may be implemented using a non-transitory computer readable media to having stored thereon executable instructions that when executed by the processor of a computer control the processor to perform steps. Exemplary non-transitory computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for handset providing mobile network operator controlled content to mobile subscribers using social networking messages described herein. In addition, a computer readable medium that implements the subject matter described herein may be distributed across multiple physical devices and/or computing platforms.

DETAILED DESCRIPTION

Figure 1:
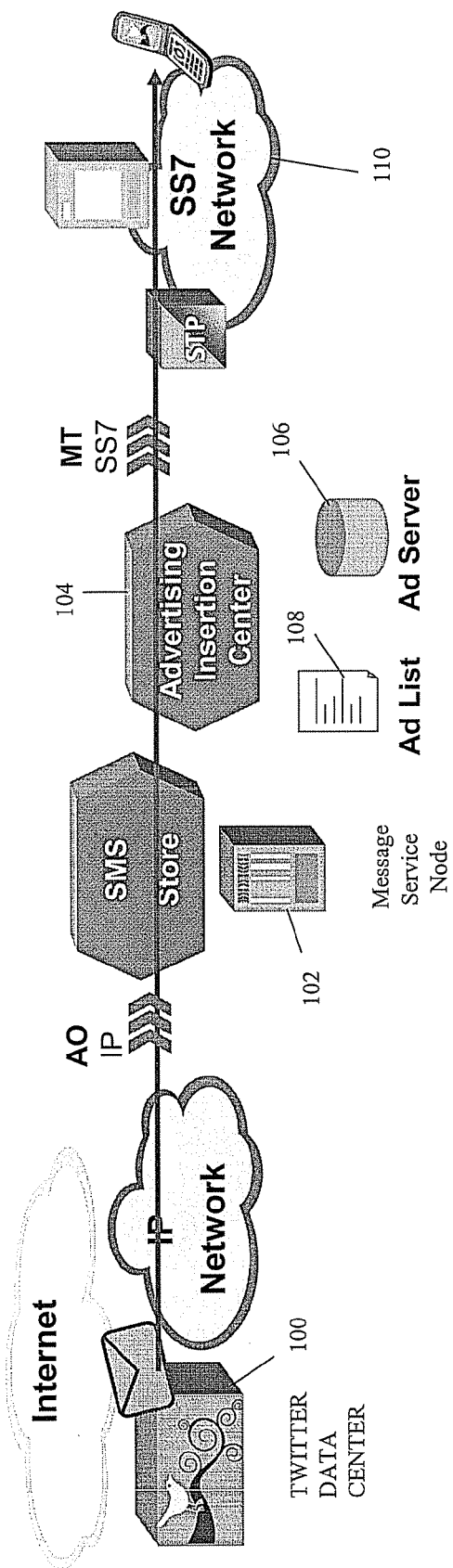
FIG. 1 is a network diagram illustrating an exemplary system for delivering mobile network operator controlled content to subscribers using social networking messages according to an embodiment of the subject matter described herein.

The subject matter described herein includes methods, systems, and computer readable media for providing mobile network operator controlled content to mobile subscribers using social networking messages. FIG. 1 is a network diagram illustrating an exemplary system for delivering mobile network operator controlled content to subscribers using social networking messages. Referring to FIG. 1, a social networking data center 100, such as the Twitter data center 100, generates social networking messages to be delivered to followers. In the example illustrated in FIG. 1, social networking data center 100 generates application originated Internet protocol messages containing social networking content to be delivered to mobile subscribers. The application originated Internet protocol messages may be short message peer-to-peer (SMPP) messages that are delivered to message service node 102. Message service node 102 may be an SMSC, an SMS router, or any other node capable of generating messages to be sent to subscriber terminals. Message service 102 may generate mobile terminated SMS messages for delivering the social networking messages to the mobile subscriber. An ad insertion center 104 may trigger ad server 106 to obtain mobile network operator controlled ad content from an ad list 108 and return the ad content to message service node 102 for insertion in the social networking message. The social networking message is then converted into a mobile terminated SMS message and delivered to the mobile subscriber 108 via the SMS network. The ad content inserted in the message may be used by the mobile network operator to offset costs for the resources used for delivering the message. The first 20 characters of the message content in the social networking message contains the Twitter user name, which identifies the followed user, and these characters may be used by ad server 106 to determine the ad content.

Figure 2:
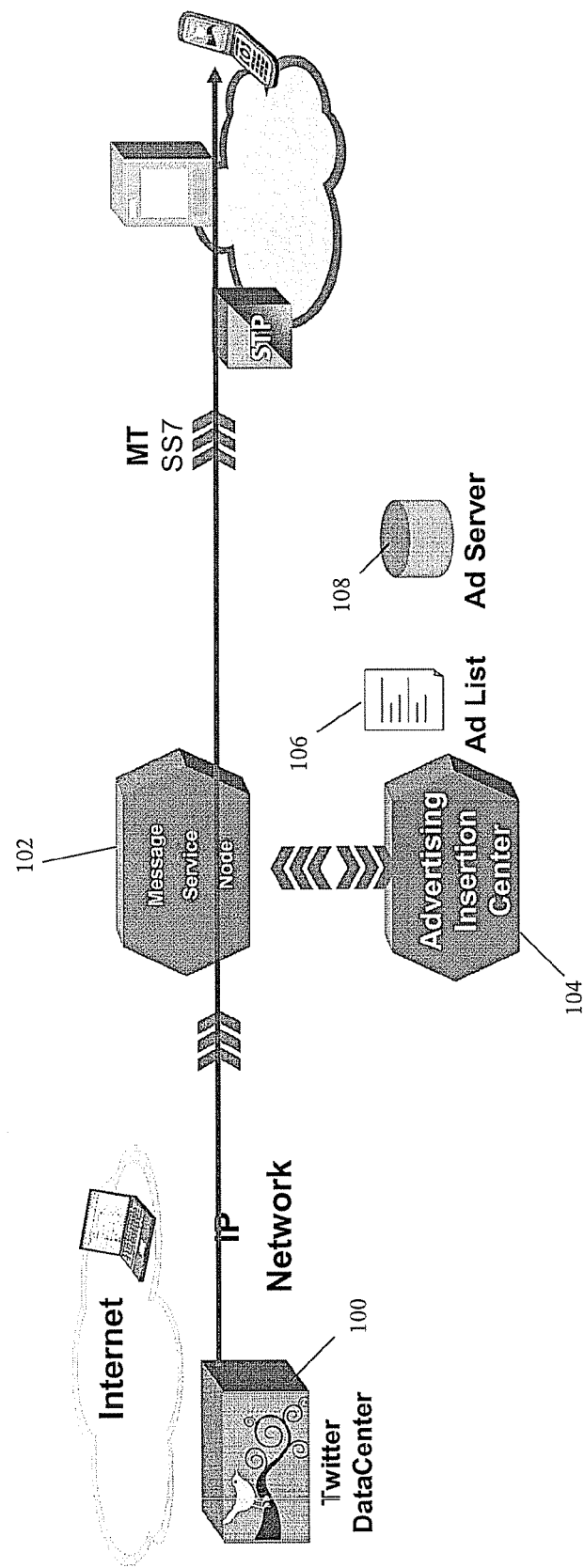
FIG. 2 is a network diagram illustrating an exemplary system for delivering mobile network operator controlled content to subscribers using social networking messages according to an alternate embodiment of the subject matter described herein.

In the example illustrated in FIG. 1, the ad content is inserted in the mobile terminated SMS message. In an alternate embodiment, the ad content may be inserted by the SMSC into the social networking message before sending the mobile terminated SMS message. FIG. 2 illustrates this option. In FIG. 2, Twitter data center 100 sends an application originated IP message containing social networking content to message service node 102. Message service node 102 determines that the message is a social networking message and sends a request to ad insertion center 104. Ad insertion center 104 triggers ad server 106 with 20 characters of the message content that identifies the Twitter originator user name. The ad server sends back mobile network operator controlled content to be inserted in the social networking message. The ad insertion center 104 inserts the content in the message and sends the message back to message service node 102. Message service node 102 attempts to deliver the mobile terminated SMS message to the recipient. In an alternate embodiment, message service node 102 or ad insertion center 104 may generate a message separate from the social networking message that includes the ad content and may send the separate message to the intended recipients of the social networking message. For example, if the social networking message is multicast to a group of followers of a Twitter subscriber, then the separate message with the ad (or other mobile network operator controlled) content may be sent to the same group of subscribers by obtaining the address information from the social networking message, from the Twitter data center, or from a separate database using information obtained from the social networking message or the Twitter data center.

In the examples illustrated in FIGS. 1 and 2, an ad insertion center 104 and ad server 106 separate from message service node 102 determine the mobile network operator controlled content to be inserted in a message. It is understood that the functionality of ad insertion center 104 and ad server 106 can be combined into a single content insertion module that determines any type of mobile network operator controlled content to be delivered to a mobile subscriber that receives a social networking message. It is also understood that the content insertion module may be integrated with or separate from message service node 102.

In one example, the content that is inserted in the social networking message can be content that is related to the originator, i.e., the followed individual. For example, if the followed individual is Tiger Woods, the ad content inserted in the message may be a Nike golf ad. In an alternate example, the ad content may be tailored to the SMS recipient. For example, ad insertion center 104 may use advertisement profiling and may have access to recipient-related information (e.g., interests, location, sex, age, ethnicity, etc.). If the SMS recipient is a car enthusiast, the ad content inserted in the message may be a car-related ad. In yet another example, the ad content may be selected based on a combination of the followed person and the SMS recipient. For example, if the followed individual is Tiger Woods, and if the SMS recipient is a car enthusiast, the ad content inserted in the message may be a Buick automobile ad.

In the examples illustrated in FIGS. 1 and 2, the mobile network operator controlled content is inserted in the social networking message, and the combined message is delivered via SMS. However, the subject matter described herein is not limited to such an implementation. In an alternate example, the ad content may be delivered to the mobile subscriber using a separate social networking message from social networking messages that are used to deliver the content. For example, in FIG. 2, the mobile network operator that operates message service node 102 may establish an account with Twitter data center 100. When Twitter data center 100 generates a social networking message, message service node 102 converts the message to a mobile terminated SMS message without ad insertion and sends the message to mobile subscriber 110. Message service node 102 may then generate a separate SMS message that includes the ad content and send the separate SMS message to mobile subscriber 110.

In one embodiment, message service node 102 may request the ad content to be inserted in the message based on the previously sent social networking message. The separate SMS message may be generated after the mobile terminated SMS message that carried the social networking content. In a second embodiment, separate SMS messages that includes ad content may be sent based on a ratio of received or sent social networking messages or other criteria. In such an embodiment, message service node 102 may request ad content to be inserted in a separate SMS message after the ratio or other criteria has been met. For example, a separate SMS message that includes ad content may be generated and sent to mobile subscriber 110 for every 5 social networking messages sent to a mobile subscriber 110. In yet another alternate implementation, Twitter data center 100 may send a blank message before or after the first social networking message. The blank message may identify the followed individual so that message service node 102 can determine the appropriate content to insert in the message and forward the message to mobile subscriber 110.

Although the examples illustrated in FIGS. 1 and 2 show implementations where social networking and ad content is delivered to mobile subscribers via SMS, the subject matter described herein is not limited to using SMS to deliver such content. Any type of message service message used to deliver viewable content to subscribers can be used without parting from the scope of the subject matter described herein. Examples of other types of message service messages other than SMS that may be used include multimedia message service (MMS) messages and instant messages (IM).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing mobile network operator controlled content to mobile subscribers using social networking messages, the method comprising:
   receiving, by a mobile network operator node implemented using a processor and a memory, a message for delivery to one or more subscribers of the mobile network operator's network;
   determining, by the mobile network operator node, whether the message is a first type of social networking message, wherein the first type of social networking message is originated by a first type of social networking server and wherein the mobile network operator node is separate from the first type of social networking server;
   using, by the mobile network operator node, a ratio of the first type of social networking messages lacking mobile network operator controlled content sent to a subscriber of the mobile network operator's network to the first type of social networking messages containing mobile network operator controlled content sent to the subscriber of the mobile network operator's network and determining, by the mobile network operator node, whether a threshold associated with the ratio has been met;
   in response to determining that the message is the first type of social networking message and that the threshold associated with the ratio has been met, providing, by the mobile network operator node, the first type of social networking message and mobile network operator controlled content to the subscriber, wherein the providing of the first type of social networking message and the mobile network operator controlled content to the subscriber includes inserting the content in the first type of social networking message, wherein the mobile network operator controlled content is determined based on at least one of a followed subject of the first type of social networking message, the one or more subscribers, and the mobile network; and
   wherein the mobile network operator controlled content includes advertising content to offset costs for delivery of the first type of social networking messages to the one or more subscribers.

2. The method of claim 1 wherein the first type of social networking message comprises a Twitter message.

3. The method of claim 1 wherein the providing of the first type of social networking message and the mobile network operator controlled content to the subscriber includes inserting the content in the first type of social networking message and delivering the first type of social networking message to the subscriber using a message service message.

4. The method of claim 3 wherein the message service message comprises one of: short message service message, a multimedia message service message, and an instant message.

5. A system for providing mobile network operator controlled content to mobile subscribers using social networking messages, the system comprising:
   a message service node implemented using a processor and a memory, wherein the message service node is for receiving a message for delivery to one or more subscribers of a mobile network operator's network, for determining whether the message is a first type of social networking message, for using a ratio of the first type of social networking messages lacking mobile network operator controlled content sent to a subscriber of the mobile network operator's network to the first type of social networking messages containing mobile network operator controlled content sent to the subscriber of the mobile network operator's network, and for determining whether the threshold associated with the ratio has been met, wherein the first type of social networking message is originated by a first type of social networking server and wherein the message service node is separate from the first type of social networking server; and
   a content insertion module located in the message service node for, in response to a determination that the message is the first type of social networking message and that the threshold associated with the ratio has been met, identifying mobile network operator controlled content to be delivered to the subscriber, wherein the message service node delivers the first type social networking message and the content to the subscriber, wherein the message service node is configured to deliver the mobile network operator controlled content to the subscriber using the same message used to deliver social networking content to the subscriber, wherein the content insertion module is configured to identify the mobile network operator controlled content based on at least one of a followed individual, the subscriber, and the mobile network, and
   wherein the mobile network operator controlled content includes advertising content to offset costs for delivery of the first type of social networking messages to the one or more subscribers.

6. The system of claim 5 wherein the first type of social networking message comprises a Twitter message.

7. The system of claim 5 wherein the message service node is configured to insert the content in the social networking message and deliver the first type of social networking message to the subscriber using a message service message.

8. The system of claim 7 wherein the message service message comprises one of a short message service, a multimedia message service message, and an instant message.

9. The system of claim 5 wherein the content insertion module is controlled by the mobile network operator.

10. The system of claim 5 wherein the message service node comprises a message service center.

11. The system of claim 5 wherein the message service node comprises a message service message router.

12. A non-transitory computer readable medium having stored thereon executable instructions that when executed by the processor of a computer control the computer to perform steps comprising:
   receiving, by a mobile network operator node implemented using a processor and a memory, a message for delivery to one or more subscribers of the mobile network operator's network;
   determining, by the mobile network operator node, whether the message is a first type of social networking message, wherein the first type of social networking message is originated by a first type of social networking server and wherein the mobile network operator node is separate from the first type of social networking server;

using, by the mobile network operator node, a ratio of the first type of social networking messages lacking mobile network operator controlled content sent to a subscriber of the mobile network operator's network to the first type of social networking messages containing mobile network operator controlled content sent to the subscriber of the mobile network operator's network and determining, by the mobile network operator node, whether a threshold associated with the ratio has been met;

in response to determining that the message is the first type of social networking message and that the threshold associated with the ratio has been met, providing, by the mobile network operator node, the first type of social networking message and mobile network operator controlled content to the subscriber, wherein the providing of the first type of social networking message and the mobile network operator controlled content to the subscriber includes inserting the content in the first type of social networking message, wherein the mobile network operator controlled content is determined based on at least one of a followed subject of the first type of social networking message, the one or more subscribers, and the mobile network; and wherein the mobile network operator controlled content includes advertising content to offset costs for delivery of the first type of social networking messages to the one or more subscribers.

\* \* \* \* \*